Feb. 7, 1967 R. E. DILGREN 3,302,711
PETROLEUM RECOVERY WITH CHEMICAL INTERACTING
FLOODS FORMING ORGANIC SULFONATES
Filed Sept. 22, 1964
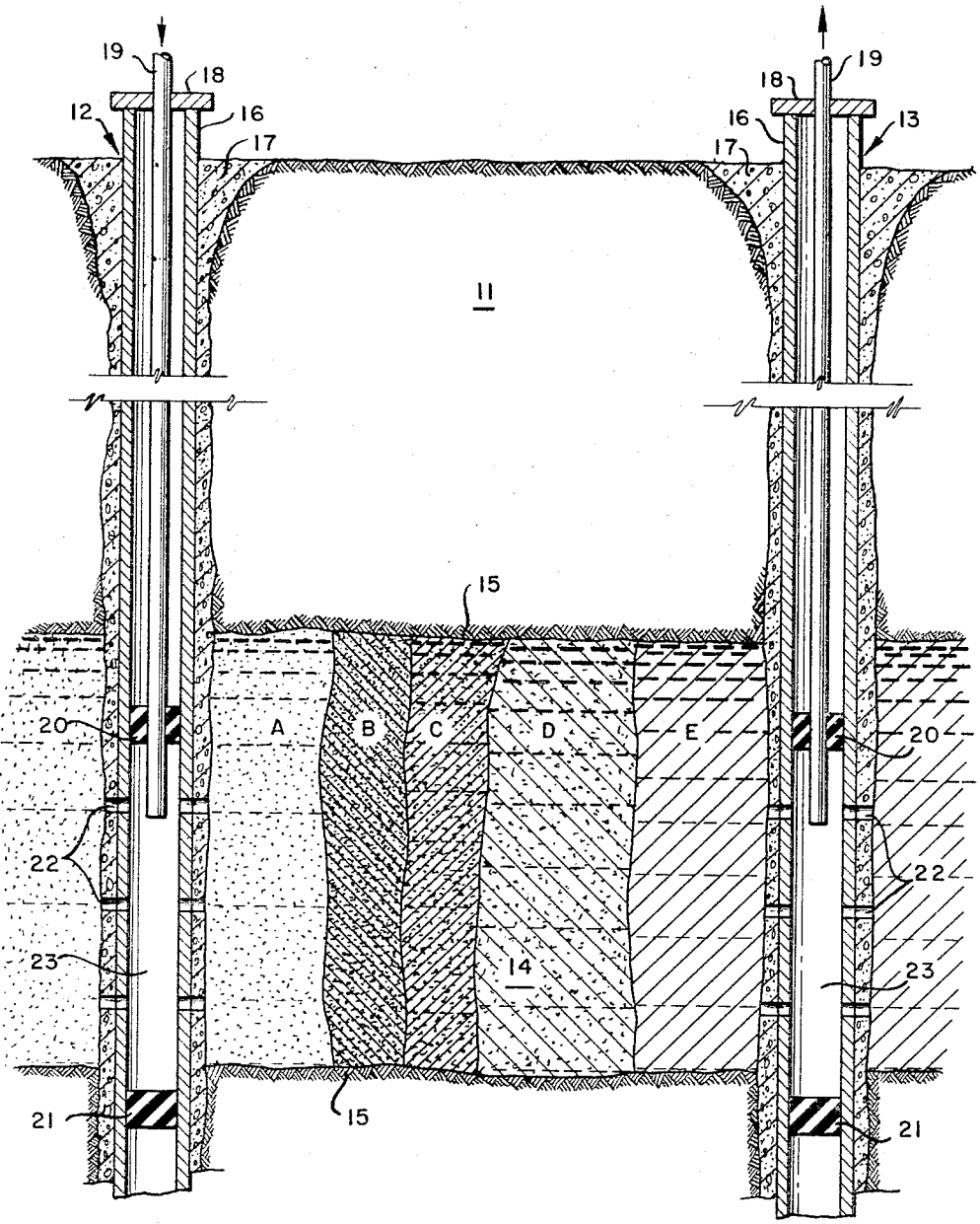
INVENTOR:
RICHARD E. DILGREN
BY: *Oswald H. Wilmore*
HIS ATTORNEY

United States Patent Office 3,302,711
Patented Feb. 7, 1967

3,302,711
PETROLEUM RECOVERY WITH CHEMICAL INTERACTING FLOODS FORMING ORGANIC SULFONATES
Richard E. Dilgren, Houston, Tex., assignor to Shell Oil Company, New York, N.Y., a corporation of Delaware
Filed Sept. 22, 1964, Ser. No. 398,329
8 Claims. (Cl. 166—9)

This invention relates to a method for recovering petroleum from subterranean reservoirs and, more particularly, to an efficient and effective technique of petroleum recovery using chemical interacting floods injected into the reservoir formation.

It is well accepted that only 10 to 30% of the total petroleum in subterranean reservoir formations is recovered by the so-called "primary recovery technique" such as natural flow, gas-lift and pumping techniques. Even more sophisticated primary recovery techniques such as re-pressurization are unable to improve the petroleum recovery much above 30% of the actual petroleum present. "Secondary recovery techniques" which broadly encompass all recovery methods not within the ambit of the "primary recovery techniques" are usually able to "sweep" a greater percentage of the petroleum from reservoir formations which are unproduceable by primary recovery techniques or have been depleted through the use of such techniques. In the secondary recovery methods, it is quite common to use some method of reservoir energy augmentation to aid in producing the petroleum. Quite commonly, the energy is provided by water-floods, gas-floods, or other types of fluid drives which are injected into the formation through injection wells extending downwardly into the petroleum bearing reservoir zone.

Since, in most cases, the cheapest and most readily available fluid for flooding the reservoir formation is water, it is the one most frequently used. But, water-flooding by itself, in many cases, is unable to displace the petroleum from the reservoir because of the immiscibility of the petroleum and water and surface tensions existing in the reservoir formation, which cause a high degree of entrapment or compartmentation to occur due to capillary action of the petroleum in the pores of the reservoir formation. Often in such cases, the aqueous fluid drive tends to by-pass or "finger" through the deposits leaving significant amounts of petroleum in the reservoir formation. This is especially true when there is a large differential in the respective water and petroleum viscosities.

One method to improve the efficiency of water floods is the use of surfactants dissolved in the aqueous drive liquid injected into the reservoir formation. These surfactants tend to increase the displacement efficiency of the water-flood by modifying the surface and interfacial tensions of the several fluids in the reservoir formation, thereby reducing the capillary effect.

Even though some surfactants are known to improve the recovery efficiency of water-floods their use in reservoir systems is extremely costly in view of the relatively large surface area of a permeable formation. For example 40 acres of clean sand, three feet thick, have a surface area of approximately equal to that of the surface area of the State of Texas. Thus, it would require approximately 1000 tons of an average surfactant to place a monomolecular layer of the surfactants on such a large surface area. In view of large surface area in reservoir formations, it can be easily appreciated that surfactants which are quickly absorbed on the formation of the reservoir are precluded from use from an economic standpoint since the cost to recover the petroleum would far exceed its value. Thus, it has become imperative to employ the surfactant in a most efficient manner avoiding utilization of unusually large quantities thereof and to employ relatively inexpensive surface active agents.

In this regard, three principal considerations on the use of any surfactants in a subterranean reservoir system are:

(1) Reducing the interfacial tension between the petroleum and the water to permit the petroleum to escape from pores, capillaries, pockets and to enhance its tendency to be displaced by an aqueous drive fluid;

(2) Forming the surfactant at the petroleum-water interface where it is most needed and is most effective in modifying the interfacial surface tensions between the petroleum and water drive; and (3) Avoiding an excessive absorption of the surfactant on the formation surfaces that causes the requirement for surfactant in the process to become uneconomically large.

In the past, it has been proposed to use a water-miscible or an oil-miscible surfactant, the latter being injected ahead of the aqueous drive and the former being dissolved in the aqueous drive itself. In both of these techniques, the consumption of surfactant tends to be uneconomically large because much of it is absorbed on the formation or dispersed into location in which it is ineffective. This causes the concentration of surfactant at the petroleum-water interface at the flood front to be lower than desirable. Also, there are some techniques known, such as those described in U.S. Patent No. 3,111,985, issued November 26, 1963, to Reisberg, which inject organic carboxylic acids followed by aqueous solution of alkali metal bases which will form soaps. Such soaps are inherently inferior to organic sulfonate detergents in that they are subject to precipitation by polyvalent metal ions. In addition, the in situ formation of the soaps necessitate the injection of an aqueous liquid having a suitable high concentration of alkali metal hydroxides, and the alkali metal hydroxides tend to be used up in reaction with and/or adsorption on the silica in the reservoir rock formations.

Accordingly, it is an object of the present invention to provide a secondary recovery method using surface active organic sulfonates by which the recovery of petroleum can be accomplished at considerable savings.

Another object is to provide a process in which a sulfonate surfactant is formed at the petroleum-water interface where it is most needed and is most efficient in improving the displacement of oil from the reservoir formation.

Another object is the provision of a secondary recovery method in which low cost reactants are utilized to form a surfactant by a reaction process that continues to form small but sufficient amounts of the surfactant over the long times that are characteristic of waterflooding operations.

Also, it is an object to achieve maximum efficiency of a surfactant-enhanced water-flood with minimum absorption on the surfaces of the formation by utilizing a sulfonate surfactant and forming portions of it at the water front after the front has passed through portions of the reservoir formation.

The instant invention employs highly effective alkali metal organic sulfonates as surfactants in petroleum containing reservoir formations and forms them in a manner in which their absorption prior to their employment at oil-water interface is almost completely avoided. This is accomplished by in situ formation of the sulfonate surfactants by first injecting a sulfonatable organic compound which is liquid or is contained in an oil-miscible vehicle, preferably in a liquid hydrocarbon, and subsequently following the first injection of the sulfonatable organic compound with a second injection of at least a slug of an aqueous solution of alkali metal sulfites, particularly the bisulfites, as a part of a water-flood. By this procedure surface active alkali metal organic sulfonates are formed at the petroleum-water interface as the water-flood front progresses through the permeable formation. With this technique, as compared to prior surfactant-enhanced water-floods, it is possible to recover greater amounts of the petroleum in the formation, at reduced costs.

Other objects and advantages of the present invention will be apparent from the detailed description which follows, and the invention can be more easily understood by reference to the accompanying single drawing which is a vertical section through several well bores and a formation, diagrammatically illustrating the action of the process in a typical reservoir formation.

The accompanying single view shows a vertical section of various strata 11 penetrated by a pair of spaced well bores, e.g., an injection well 12 and a production well 13, which pass through a petroleum producing zone 14. Petroleum producing zone 14, which is permeable or has been made so by techniques such as fracturing, lies between two vertically spaced impermeable layers of strata 15. Of course, the invention is not limited to subterranean formation in which the petroleum producing zone 14 is sandwiched between spaced layers of impermeable strata but in practice, such formations are preferred for the instant process.

Two well bores 12 and 13, which are shown in the drawing, are adequate for purposes of illustration, but in practice other configurations are more likely. For example, the injection well 12 would be at epicenter of a traditional "five" or "seven" spot pattern and ringed by a plurality of recovery wells like production well 13, or some like arrangement.

No particular importance is attributed to the type of well bore construction of the wells employed in injection well 12 and production well 13 which are typical bores having well casings 16 positioned in the bore and secured with cement 17.

Casings 16 are closed with glands 18 provided with pipe strings 19 passing therethrough and extending downward inside each casing to the petroleum producing zone 14. Packers 20 seal the annulus between the pipe strings 19 and the respective well casings 16 at or near the top of the petroleum producing zones. Bottom packers 21 seal off the respective well casings 16 at or near the bottom of the petroleum producing zone 14, defining an intervening chamber 23 penetrated by the pipe strings 19. In the chamber area, the well casings 16 are perforated by a plurality of ports 22 to permit the ingress and egress of fluids communicating between the chamber 23 and the permeable petroleum producing zone 14.

In order that the invention will be more easily understood, the petroleum producing zone 14 between the injection well 12 and production well 13 has been divided into five empirical zones A, B, C, D and E, using shading to distinguish between the various zones. This is done largely for purposes of illustration and each of the zones shown represents a part of the concentric ring-shaped zones about injection well 12. These expanding successive rings having large diameters are expanded radially outward by injection pressure from well 12 until they reach the production well 13. This diagrammatically illustrates the conditions in the reservoir at an intermediate interval during the practice of the invention.

Broadly, this invention encompasses a method of recovering petroleum from permeable subterranean reservoirs by first injecting an oil-miscible liquid containing sulfonatable reactant and subsequently following with an injection of water having in solution an alkali metal sulfite which reacts with the organic reactant to form a sulfonate surfactant at the petroleum-water interface which tends to increase the amount of petroleum displaced from the reservoir formation by aqueous flood. The alkali metal bisulfites are the most preferred for the practice of the invention but where "bisulfite" is referred to in the specification and the appended claims, it is intended to refer to both "bisulfite" and "sulfite."

Unique in the instant method is an in situ-formed sulfonate surfactant that is both formed and propagated through the reservoir at the petroleum-water interface. This causes the water-flood front to displace a maximum amount of petroleum as it moves through the formation. It is through the above interaction that a minimum amount of sulfonate surfactant gives maximum efficiency to a water-flood at minimum cost. Since the surfactant is formed only at the petroleum-water interface it will not be pre-absorbed on the formation like preformed oil-miscible or water-miscible surfactants that are injected into the reservoir and may be adsorbed before they have ever been disposed at the petroleum-water interface.

More specifically, the organic reactant useful in the practice of this invention is one which will react with an alkali metal bisulfite to form surface active sulfonates. In general, the organic reactant is a high molecular weight hydrocarbon having a functional group which will accept the alkali metal sulfite ion ($NaSO_3^-$). The reaction forms sulfonated organic surfactants having a hydrophilic group making them water soluble, and a hydrophobic group favoring solubility in the petroleum. Further, the organic reactants used in the instant process are those which are preferentially soluble in the hydrocarbon phase, i.e., the reservoir petroleum, which allows the organic reactant to remain dispersed in the petroleum while the alkali metal bisulfite remains in the aqueous phase. Since the contact between the alkali metal bisulfite and the organic reactant occurs at the water-flood front as it progresses through the formation, the surfactant is formed at the interface and the petroleum is very efficiently displaced from the formation ahead of the water-front. It is through this technique that the by-passing of the petroleum is largely avoided.

Acceptable sulfonatable organic reactants of the type used for the practice of this invention are not necessarily equivalent in their ability to displace the petroleum and to react with the alkali metal bisulfite. It is very important, however, that sulfonatable organic reactants comprise oil-miscible liquids or be dissolved in liquids which are miscible with the petroleum in the reservoir but unreactive with either the petroleum or naturally occurring substances in the formation. This requirement eliminates any acidic and basic materials, such as organic acids or bases that do not contain bisulfite-sulfonatable functional groups. Generally, the sulfonatable organic reactants are preferably high molecular weight hydrocarbons of the formula

wherein R is a $C_1$ to $C_{50}$ hydrocarbon residue and X is a sulfonatable group selected from

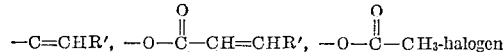

and

wherein R' is hydrogen or a $C_1$ to $C_{19}$ hydrocarbon residue. Such R—X type compounds are significantly cheaper than organic acids or bases containing a sulfonate group and when employed according to this invention give highly effective surfactants in the reservoir at the petroleum-water interface.

Of the above group of sulfonatable reactants of the type

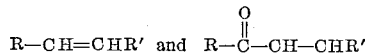

wherein R has the above meanings, are the most preferred. Also when the R and R' groups have from 1-19 carbon atoms, the compounds are very satisfactory reactants for the practice of this invention.

Some non-limiting examples of aldehydes are propional aldehyde, n-valeraldehyde, hepta aldehyde, caprylic aldehyde, pelargonic aldehyde, 1-decyl aldehyde and the like. Similarly, some non-limiting examples of alpha-halo-alkanoates are ethylchloroacetate, n-propyl chloroacetate, butyl chloroacetate, amyl chloroacetate, n-decyl chloroacetate, pentadecyl chloroacetate and the like. In the practice of the invention, it is preferred that R be a relatively high molecular weight hydrocarbon residue having from 10 to 50 carbon atoms since it is this portion of the molecule which is hydrophobic.

The alpha-halo-alkanoates are specifically applicable in limestone formations since the reaction

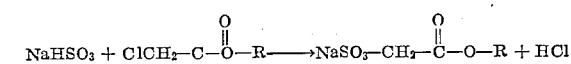

yields hydrogen chloride which dissolves the limestone making it more permeable.

Conversely, when acidic materials are not desirable in the reservoir formation the aldehyde reaction

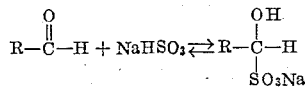

yields a neutral sulfonated organic surfactant without an acid by-product.

In the instant process, since the organic reactant is confined to the petroleum phase and the alkali metal bisulfite is confined to the aqueous phase, the formation of the surfactant occurs at the interface between the water and petroleum and is thereby formed and propagated through the reservoir in the position within the fluid system where it is most needed, without being subjected to unnecessary absorption in the formation prior to its use. The reaction between the organic reactant and the alkali metal bisulfite is relatively straight forward, with the alkali metal sulfite ion adding to the organic reactant to provide a hydrophilic substituent thereon. This makes the surfactant formed at the interface partially water soluble and insures a high surfactant concentration in the aqueous phase flood front as it moves through the formation. This greatly increases the efficiency petroleum displacement.

Obviously, it may not be desirable to continue the injection of the aqueous alkali metal bisulfite solution from economic considerations after a sufficient amount has been injected for the purposes of forming the surfactant in situ. The drive can be continued thereafter with fresh water or brine. Naturally this improves the economies of the instant process and should be practiced where conditions permit.

Organic reactants, such as those described above, which are useful in the instant process will vary from liquids to viscous solids depending largely on the molecular weight of the reactant. Further, since the efficiency of the process is high, only minimum amounts of the organic reactant need be used. It is generally preferable that the organic reactant be dissolved in an oil or hydrocarbon. Many oil-miscible liquids may be used as a vehicle for the organic reactant. These liquid hydrocarbon fractions may have a viscosity close to that of the water-flood to insure uniform mobility. Typical of hydrocarbons which are useful as vehicles are crude oil, gas-oil, jet fuel, kerosene, naphtha, the gasoline ranges and even lighter hydrocarbons which are liquefied and will remain so under the pressures employed in the process. A reason for using the lighter hydrocarbons as a vehicle is that it can be more readily forced into the pores of the formation and will have a tendency to reduce the viscosity of the reservoir petroleum which in turn will enhance the recovery.

According to initial surveys, it was found that very efficient recovery of residual petroleum in subterranean reservoirs can be effected when the hydrocarbon vehicle contains dissolved or dispersed sulfonatable organic reactants in amounts from 0.1 to 25% by weight. Although the concentration of the organic reactant in the oil-miscible vehicle can be considerably higher, and in some formations it may be required to be higher, it is desirable to keep the concentration of the organic reactant at a minimum to improve the economies of the process. In fact, concentrations as low as 1% by weight of the vehicle will be entirely satisfactory in many reservoirs.

In the practice of the invention, the oil-miscible vehicle containing organic reactants is injected through pipe string 19 of injection well 12 and moves radially outwardly into the oil-bearing formation 14 through ports 22 in chamber 23 at the lower end of the pipe string. Tests indicate that from 5% to about 35% of the pore volume of the formation is an adequate injection of the mixture of organic reactant and vehicle. A good compromise is between 10% and 20% of the pore volume of the formation for the recovery of most of the residual petroleum in the formation. Injections of greater amounts based on the pore volume, although obviously permissive, are usually to be avoided as being generally wasteful and uneconomical.

After the initial injection of the organic reactant in the oil-miscible vehicle has been accomplished, it is followed by an injection of water containing dissolved alkali metal bisulfite. The amount of dissolved alkali metal bisulfite in the injected water, which may be either fresh water or brine, should be in stoichiometric proportions to the organic reactant and preferably in excess. It may also be desirable to add viscosity increasing materials, such as carboxymethylate cellulose, partially hydrolyzed polyacrylates, etc., to the injected water in order to increase the viscosity of the water-flood. The use of inert salts in the aqueous drive is advantageous in keeping the concentration of surfactants in the aqueous drive low since they are to some extent, soluble in both oil and water.

Since the alkali metal bisulfite is relatively cheap all the water injected may contain this salt in solution and injection can be continued until the injected water with the bisulfite salt breaks through the production well(s). The alkali metal bisulfite can be formed by dissolving one or more alkali metal sulfites or bisulfites or mixtures thereof in an aqueous liquid; since the sulfites and bisulfites interact to form an equilibrium mixture when dissolved in an aqueous solution. Alternatively, improved economies can be experienced if only the first portion of the water-flood drive contains the alkali metal bisulfite in solution. This could be accomplished by the use of a slug of aqueous alkali metal bisulfite of 0.1 to 0.5 pore volumes followed by a plain water or brine drive to complete the recovery.

For a better understanding of the process, reference is made to the petroleum producing zone 14 of the drawing which is shown as consisting of five smaller zones A, B, C, D and E. Zone A represents a portion of the formation which is substantially stripped of petroleum and is filled with the injected water. Zone B contains the somewhat irregular interface between the injection water containing dissolved alkali metal bisulfite and the petroleum of the reservoir formation containing the organic reactant and its vehicle. Likewise, it is in Zone B that the organic reactant and the alkali metal bisulfite react to form the surfactant (organic sulfonates) which enables the water drive to efficiently strip the petroleum from the formation as water-flood progresses radially outwardly from injection well 12 toward production well 13. Zone C contains a petroleum bank moving ahead of the water-flood which bank has a relatively high concentration of petroleum and organic reactant in its vehicle, while Zone D represents the zone wherein the petroleum and the organic reactant and vehicle are highly dispersed. Zone E contains the petroleum in the formation at water-flood residual. By reference to this drawing it can be seen that as the injection of aqueous alkali metal bisulfite solution continues to expand radially outwardly from injection well 12, the interface where the surfactant is formed by the reaction of the alkali metal bisulfite in the organic reactant will continue to progress toward production well 13. As front progresses through the formation, the petroleum will be banked in a front directly ahead of the water front (Zone C) which eventually forces the petroleum in reservoir into the area surrounding production well 13 from which it can be withdrawn.

Of course, one of the real advantages of this highly sophisticated technique is that the surfactant is conveniently formed between the petroleum bank and the water-flood front where it is most effective in displacing the oil from the formation and prevents the water front from by-passing the oil bank and petroleum in the formation. It should be appreciated that by the unique interaction of the bisulfite alkalki metal (preferably sodium bisulfite) and the organic reactant, at the water petroleum interface, it is possible to effect a reasonably complete and very efficient recovery of petroleum from subterranean reservoirs.

The following specific examples hereinafter presented are by way of illustration and not as limitations of the scope of the invention.

EXAMPLE I

An aqueous 0.1 molar solution of sodium bisulfite was placed in a crystallization dish, after which an equal volume of a hydrocarbon solution of 0.1 M 1-decyl aldehyde was carefully layered over the aqueous phase. Three identical experiments were conducted, except for the fact that the hydrocarbon solvent was varied, the solvents in these three tests being toluene, "Nujol" and n-decalin, respectively. In each of these tests the changes in interfacial tension with respect to time were followed by means of a Du Nuoy tensiometer. Decreases in interfacial tension from 30–40 dynes/cm. to minima of 3–5 dynes/cm. (and even lower) were noted over time periods of from 4 to 8 hours at room temperatures, i.e., at 25° C.±1° C.

EXAMPLE II

A sand pack typical of an oil-bearing reservoir formation is prepared by disposing in a suitable tube a sand having an average permeability of about 4.5 darcies and an average porosity of about 35% in a tube. This sand pack is then alternately flooded with water and crude oil from the Benton field until the last water-flood ceases to displace oil. This usually occurs when the residual crude oil concentration in the sand amounts to about 35% of the pore volume of the sand pack.

Thereafter, a slug of kerosene having a volume equivalent to about 20% of the pore volume of the sand pack and containing about 5% by volume of a commercial grade dodecyl aldehyde, is introduced by injection into the aforementioned tube containing the aforesaid sand pack. A sulfonating agent is then introduced by injecting a slug of aqueous 4-molar sodium bisulfite solution having a volume equivalent to about 20% of the pore volume of the sand pack. The thus injected fluids are then displaced through the sand pack by injecting thereinto potable water.

In the initial phases of the fluid injection the liquids displaced from the sand pack comprise separate oil and water phases. The sulfonate formed across the interface between the oil and water phases acts as a surfactant which lowers the interfacial tension between the oil and the water. After the injection of about one pore volume of the potable water, the displaced liquids comprise oil and water phases having an oil-to-water ratio which undergoes some decrease and then remains substantially constant until more than about 90% of the residual oil is displaced and recovered from the sand pack.

EXAMPLE III

Into a reservoir of 100,000 bbl. pore volume from which about 60% of its total oil content had been recovered by employing conventional methods, including conventional water-flooding, one injects 10,000 bbls. of crude oil produced from said formation, this amount of crude oil being equivalent to about 35 volume percent of the oil remaining in the reservoir. This introduced crude oil contains about 5% by volume of dioctadecyl maleate. Following this injection of the maleate-containing crude oil, an equal amount of water containing 5% by sodium bisulfite is injected. After the injection of the aqueous bisulfite solution is completed, injection of flood water is resumed until the ratio of water-to-oil at the producing wells reaches an uneconomical high, e.g., about 100 to 1. In addition to the injected oil, about 90% of the oil originally remaining in the reservoir is thus recovered by the process of the present invention.

EXAMPLE IV

An aqueous 0.1 molar solution of sodium sulfite is placed in a crystallization dish, after which an equal volume of a 0.1 molar solution of n-decyl chloroacetate in n-decalin is carefully layered over the aqueous phase, the changes (decreases) in interfacial tension with respect to time being determinable by means of a Du Nuoy tensiometer, these decreases in interfacial tension being in the neighborhood of from the original 30–40 dynes/cm. to a minima of 3–5 dynes/cm. at the end of from 4 to 8 hours at room temperatures, i.e., at 25° C.±1° C.

EXAMPLE V

A sand pack typical of an oil-bearing reservoir formation is prepared by disposing in a suitable tube a sand having an average permeability of about 4.5 darcies and an average porosity of about 35% in a tube. This sand pack is then alternately floded with water and crude oil from the Benton field until the last water-flood ceases to displace oil. This usually occurs when the residual crude oil concentration in the sand amounts to about 35% of the pore volume of the sand pack.

Thereafter, a slug of kerosene having a volume equivalent to about 20% of the pore volume of the sand pack and containing about 5% by volume of n-hexadecyl chloroacetate is introduced by injection into the aforementioned tube containing the aforesaid sand pack. A sulfonating agent is then introduced by injecting a slug of aqueous 1.0 molar sodium sulfite solution having a volume equivalent to about 20% of the pore volume of the sand pack. The thus injected fluids are then displaced through the sand pack by injecting thereinto potable water. After the injection of about one pore volume of the potable water, the displaced liquids comprise oil and water phases having an oil-to-water ratio which undergoes some decrease and then remain substantially constant until more than about 90% of the residual oil is displaced and recovered from the sand pack.

I claim as my invention:

1. A method of recovering petroleum dispersed in permeable subterranean reservoir formations which are penetrated by at least one injection well and at least one production well which comprises the steps of first injecting through said injection well into said formation a slug of oil-miscible liquid that contains a sulfonatable organic compound and is capable of diluting and interconnecting droplets of petroleum in said formation, subsequently injecting an aqueous alkali metal bisulfite solution as the frontal portion of a water-flood and thereby displacing the partially diluted petroleum from said formation and forming surface-active organic sulfonates at the petroleum-water interfaces by the interaction of said organic compound and said alkali metal bisulfite solution, said sulfonates aiding the displacement of said partially diluted petroleum, and recovering the displaced petroleum through said production well.

2. A method according to claim 1 in which the organic sulfonatable compound is dissolved in a petroleum-miscible liquid which constitutes from 5 to 35 percent of the pore volume of the formation.

3. A process according to claim 2 in which the petroleum-miscible liquid is a hydrocarbon fraction boiling below 600° F.

4. A method according to claim 3 in which the sulfonatable organic compound is present in the petroleum-miscible liquid from 0.1 to 25 percent by weight.

5. A method according to claim 4 in which said aqueous alkali metal bisulfite solution is injected as a slug and is followed by the injection of flooding water.

6. A method of recovering petroleum dispersed in permeable subterranean reservoir formations which are penetrated by at least one injection well and at least one production well which comprises the steps of first introducing into the formation via said injection well a slug constituting from 5 to 35 percent of the pore volume of said formation of a sulfonatable organic compound of the formula

R—X wherein R is a hydrocarbon residue having from 2 to 50 carbon atoms and X is a sulfonatable radical selected from the group consisting of $$-C=CHR',\ -O-\overset{O}{\underset{\|}{C}}-CH=CHR',\ -O-\overset{O}{\underset{\|}{C}}-CH_2\text{-halogen}$$

and $$-\overset{O}{\underset{\|}{C}}-H$$

wherein R' is selected from the group consisting of hydrogen and $C_1$ to $C_{19}$ hydrocarbon residues, dissolved in a hydrocarbon fraction boiling below 600° F. to partially solubilize petroleum in said formation, subsequently injecting through said injection well an aqueous alkali metal bisulfite solution as flooding water and thereby displacing said partially diluted petroleum from said formation and forming surface-active organic sulfonates at the petroleum-water interfaces through the interaction of said organic compound and said alkali metal bisulfite solution which effects efficient displacement of said diluted petroleum toward said production well, and recovering said displaced petroleum through said production well.

7. A method according to claim 6 in which the sulfonatable organic compound has the formula

R—C=CHR' wherein R is a hydrocarbon residue having from 2 to 50 carbon atoms, and R' is selected from the group consisting of hydrogen and $C_1$ to $C_{19}$ hydrocarbon residues.

8. A method according to claim 7 in which only the initial portion of the flooding water is an aqueous alkali metal bisulfite solution and the balance is fresh water.

References Cited by the Examiner

UNITED STATES PATENTS

| | | | |
|---|---|---|---|
| 3,111,984 | 11/1963 | Reisberg | 166—9 |
| 3,111,985 | 11/1963 | Reisberg | 166—9 |
| 3,167,119 | 1/1965 | Meadors | 166—9 |
| 3,174,542 | 3/1965 | Reisberg | 166—9 |
| 3,185,214 | 5/1965 | Bernard et al. | 166—9 |
| 3,258,072 | 6/1966 | Froning | 166—9 |

CHARLES E. O'CONNELL, *Primary Examiner.*

S. J. NOVOSAD, *Assistant Examiner.*